Feb. 16, 1943.　　　D. B. GRABLE　　　2,311,225
PIPE ROTATING APPARATUS
Filed Jan. 8, 1940　　　3 Sheets-Sheet 1

Inventor
DONOVAN B. GRABLE
H. Calvin White
Attorney

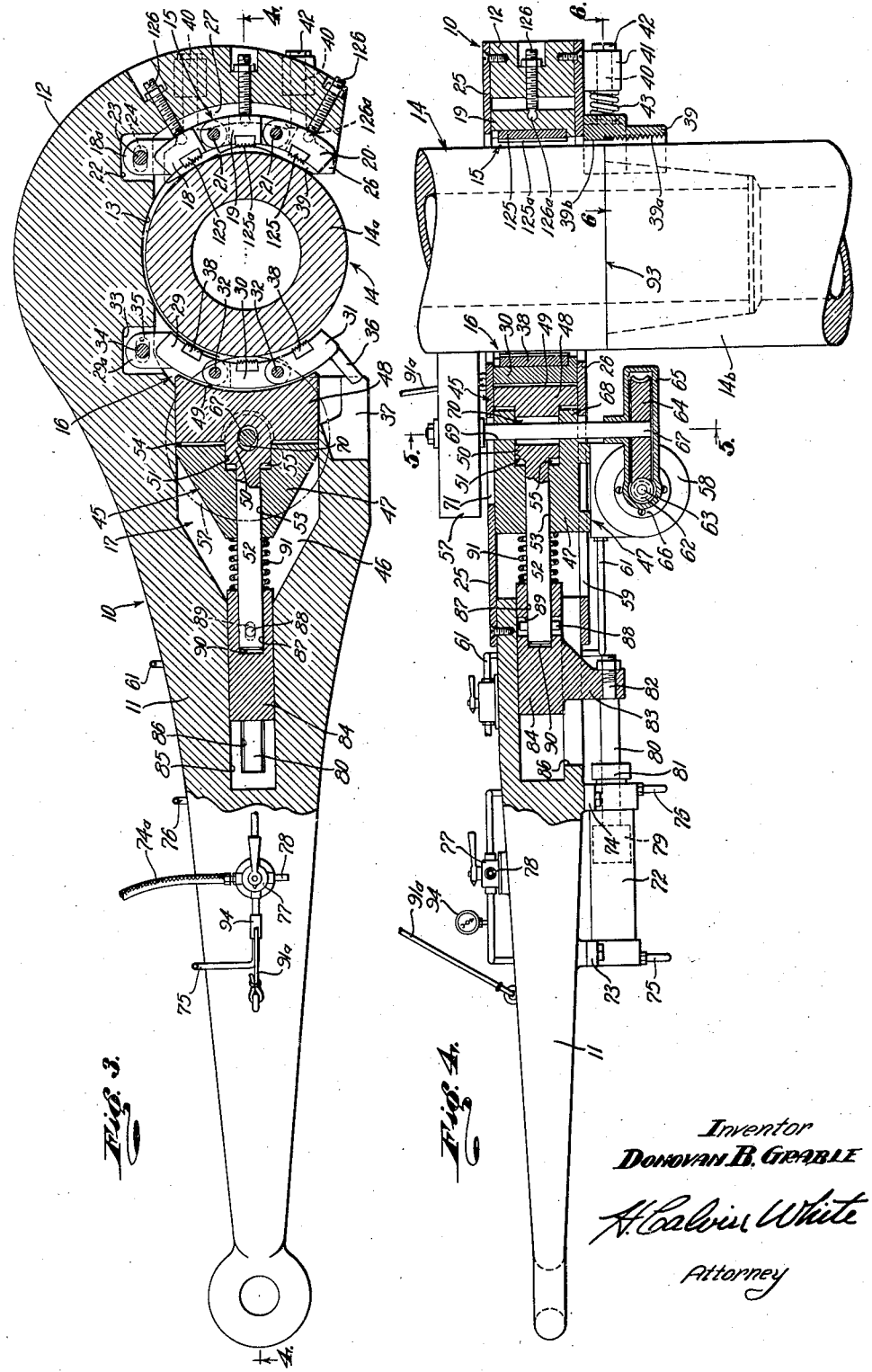

Feb. 16, 1943.   D. B. GRABLE   2,311,225
PIPE ROTATING APPARATUS
Filed Jan. 8, 1940   3 Sheets-Sheet 3
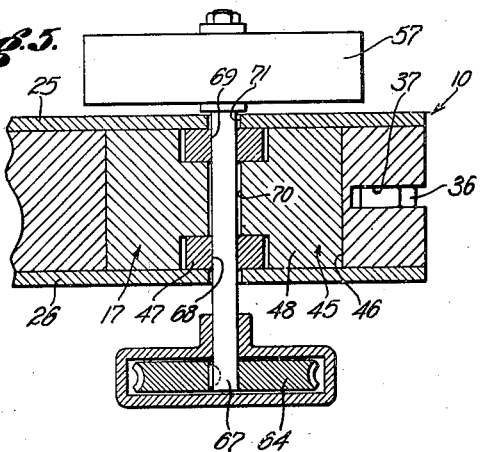
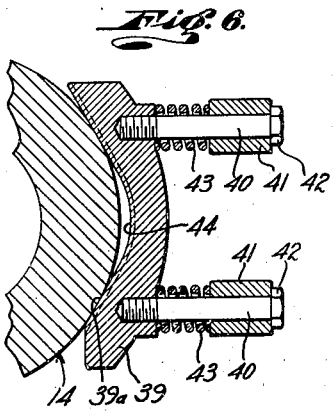
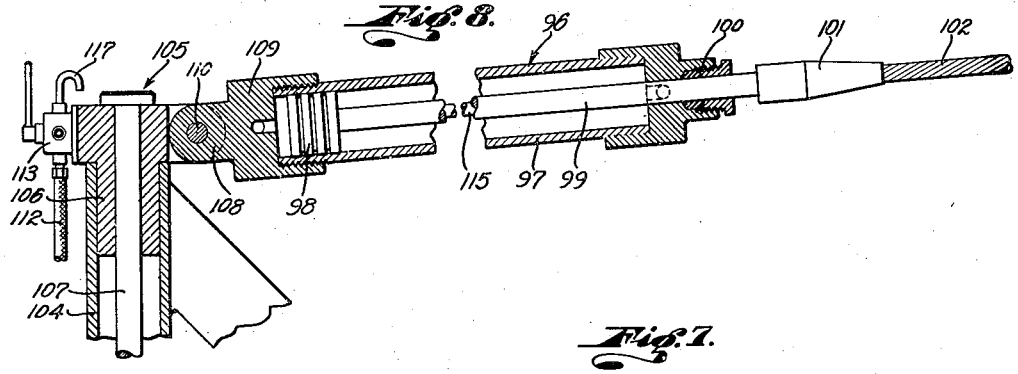
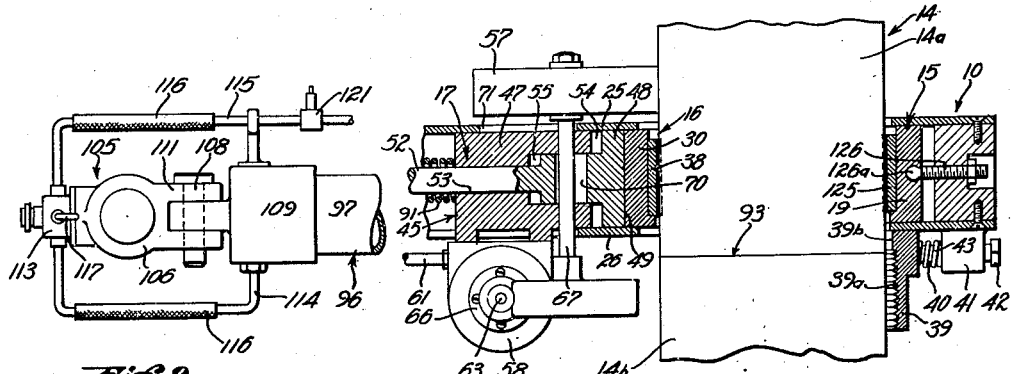
Inventor
DONOVAN B. GRABLE
H. Calvin White
Attorney Patented Feb. 16, 1943

2,311,225

UNITED STATES PATENT OFFICE 2,311,225

PIPE ROTATING APPARATUS

Donovan B. Grable, Long Beach, Calif.

Application January 8, 1940, Serial No. 312,946

14 Claims. (Cl. 81—57)

This invention has to do generally with pipe rotating apparatus, particularly for the purpose of connecting and disconnecting sections of well pipe, tubing or rods, and has for its general purpose to provide improvements in such apparatus that will enable the work to be accomplished more simply and expeditiously than with the types of equipment heretofore available, and with much less hazard to the operators handling the apparatus.

The conventional and long used practices in making up or disconnecting well pipe strings, typically strings of tubing, have required the use of rope lines or cables both in direct application to the pipe in the course of making or breaking the pipe joints, and in the operation of pipe tongs for initially breaking or finally making up the joints. These conventional practices are well known and need not be described in detail, other than to refer to the recognized fact that they are extremely hazardous to the operators because of the danger of broken and whipping lines, and entanglement in the lines that may lead to an operator being carried into machinery on the floor or up into the derrick. In part at least, these hazards have existed by reason of the nature and limitations of the pipe rotating methods and equipment employed, and the necessity for using not only the pipe tongs themselves, but various ropes and lines to supplement the uses of the tongs.

Generally speaking the invention obviates these difficulties and hazards by incorporating in unitized apparatus that may have self-contained power, all the instrumentalities required for rotating the pipe in all stages of making up or breaking the joints, without the necessity for the usual rope lines subject to breaking and entanglement. In addition, the invention permits the application of rotative power to the pipe section or stand being connected to or disconnected from the string, by methods such as not to require rotation of the pipe string proper, or cause disturbances in the well that result from rotation of the pipe string.

In accordance with the invention I have provided an improved power tongs characterized in that it possesses a self-contained power unit to insure forceful engagement of the gripping elements with the pipe to accomplish rotation of the pipe by bodily turning of the tongs, and characterized further by powered pipe rotating means adapted to the pipe section being connected or disconnected before the joint reaches a condition of tight take-up, or after initial breaking, all without necessity for bodily rotation of the tongs. The present tongs may be described generally as comprising a movable pipe gripping element, a rotatably driven member adapted to engage and rotate the pipe, and a power source carried by the tongs body and operatively associated with the pipe gripping element and pipe rotating member so as to bring them into engagement with the pipe under control of the operator. As will hereinafter appear, the operative connection between the power source and the gripping element and pipe rotating member is such that the two may be sequentially applied to the pipe. For example in a make-up tongs, its operation is controlled to first bring the rotating member into engagement with the pipe, but with the gripping element disengaged therefrom, to screw the joint to a degree of tightness at which the full power of the tongs may be required to finally tighten and make-up the joint. Then the movable gripping element is forced into tight engagement with the pipe and the tongs bodily rotated to complete the joint. In the breaking tongs, a reverse operation occurs in that the gripping element first is applied to the pipe and the tongs bodily turned to initially break the joint, after which the gripping element is released and the rotating member brought into operation to rotate the pipe out of the joint.

The invention contemplates a further improved feature in the provision of simplified and positively acting apparatus for bodily swinging the tongs. Briefly, this apparatus comprises in its preferred form an air or steam cylinder and piston assembly mounted for horizontal and vertical swinging movement and connected to the tongs body or handle so as to exert a swinging pull on the tongs in making up or breaking the pipe joint, as the case may be. Suitable provision such as an indicator of the air or steam pressure in the cylinder and a relief valve imposing a predetermined maximum limit on the pressure, may be provided to enable the operator to know at all times the magnitude of pull being exerted on the tongs, and to insure that a predetermined maximum pull will not be exceeded, all with the object of avoiding excessive forces applied to the tongs that might otherwise injure the pipe or break parts of the pipe rotating equipment itself.

The invention contemplates numerous additional features and objects, but all of these as well as the feature referred to in the foregoing may be recognized and understood to better advantage without necessity for further preliminary discussion, from the following detailed description of the invention in certain illustrative and typical forms. Reference is had throughout the description to the accompanying drawings in which:

Fig. 3 is a view partly in horizontal section, illustrating the working parts of the tongs;

Fig. 4 is in part a vertical section taken on line 4—4 of Fig. 3;

Fig. 5 is an enlarged cross section on line 5—5 of Fig. 4;

Fig. 6 is a fragmentary enlarged section on line 6—6 of Fig. 4;

Fig. 7 is a fragmentary vertical section showing certain of the tongs parts in the aspects of Fig. 4 but in changed positions;

Fig. 8 is an enlarged sectional view of the reach cylinder taken on line 8—8 of Fig. 1; and Fig. 9 is a plan view of the reach cylinder mounting.

Figure 1:
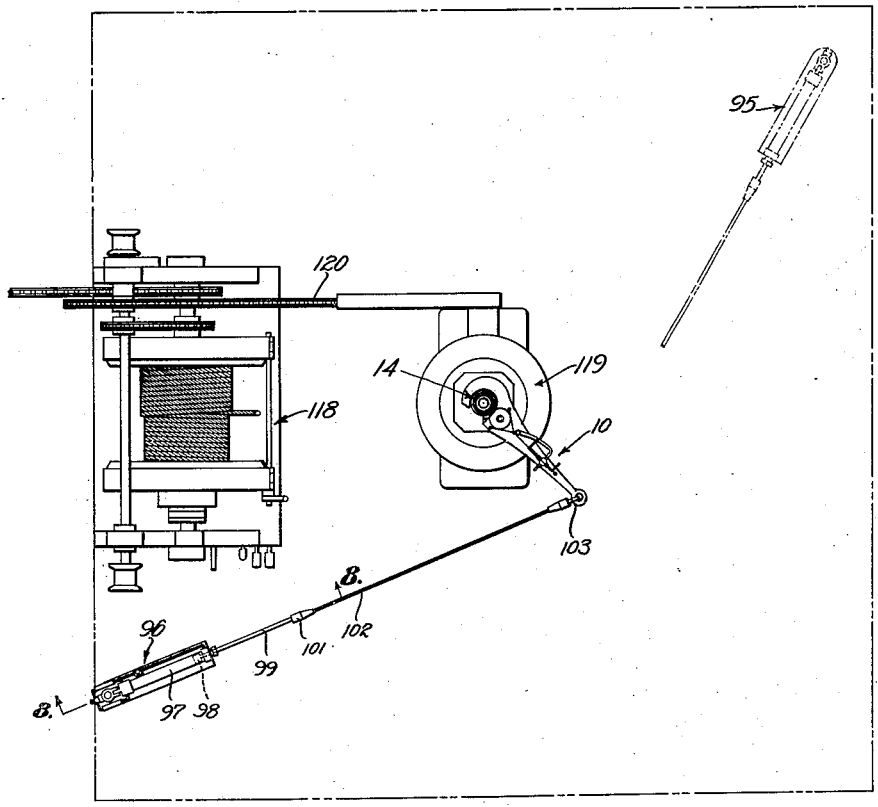
Fig. 1 is a plan view showing a conventionally illustrated draw works with the tongs and the tongs operating reach applied to the drill pipe.

Referring first to Figs. 3 and 4, the tongs, generally indicated at 10, comprise an elongated body 11 having a curved end portion 12 containing a recess or opening 13 within which the rod or pipe 14 is received. Typically, the recessed portion 13 of the tongs may contain two sets of pipe gripping elements generally indicated at 15 and 16, capable of relative radial movement to engage and disengage the pipe. Although capable of adjustment and perhaps movement within the body except when engaged by the pipe, the pipe engaging elements 15 may be regarded as a relatively stationary set, and the elements 16 as the movable set adapted to be operated in applying them to the pipe, by the body contained mechanism generally indicated at 17, all as will hereinafter appear.

The pipe gripping elements 15 may be of any suitable type and form, and are shown typically as comprising links 18, 19 and 20 pivotally connected by pins 21, the innermost link 18 having a lug 18a projecting within a body recess 22. Lug 18a is connected to the body for pivotal and bodily movement relative thereto by a pin 23 terminating within slots or recesses 24 in cover plates 25 and 26 applied to the top and bottom surfaces of the body, as illustrated in Fig. 4. The pipe gripping surface of each of the links 18, 19 and 20, is formed by an integral or inserted die 125 having vertically extending pipe engaging teeth 125a. The assembly of links may be radially adjusted within the tongs body, or the relative positions of the individual links adjusted, by radially positioned back-up screws 126 having ball and socket connections at 126a with the links in space 27, the screws being individually adjustable to give any desired variation in the link positions.

The movable assembly 16 of pipe gripping elements similarly may comprise a plurality of links 29, 30 and 31, pivotally interconnected by pins 32, with the inner link 29 having a lug 29a received within the body recess 33 and connected to the body plates 25 and 26 by pin 34 terminating within slots 35 in the plates. The outer end of the link assembly 16 is given vertical support by the body and also capacity for swinging movement in engaging and disengaging the pipe, by providing link 31 with an extension or lug 36 received and slidable within a slot 37 in the body, see particularly Fig. 5. The links 29, 30 and 31 are shown also to carry toothed pipe engaging dies 38.

At its outer end and beneath the link assembly 16, the tongs body carries a radially movable stop member 39, which preferably is of curved form, and is suitably supported for bodily movement by pins 40 extending from the member through bearings 41 and carrying heads or nuts 42 at their outer ends. Member 39 is yieldably thrust inward to pipe engaging position, which is inwardly beyond the teeth 125a of dies 125, by coil springs 43 placed about pins 40 and confined between the member 39 and the bearings 41. As shown in Fig. 6, the inner surface 44 of member 39 has a curvature less than that of the outer surface of pipe 14, or of other pipes having different but about the same diameter, so as to insure at least two point contact between the stop member and the pipe being engaged by the tongs. In this manner, member 39 serves in addition to its later described functions, to properly position the link assembly 15 for engagement with the pipe.

A movable carriage assembly, generally indicated at 45 and contained within a body recess 46 intersecting the pipe receiving opening 13, operates to apply sequentially to the pipe a rotatably driven pipe rotating member 57 and the movable gripping element assembly 16. The carriage 45 comprises two relatively movable sections 47 and 48, the latter having a curved surface 49 adapted to engage the outer surfaces of links 29, 30 and 31 in pressing the gripping dies against the pipe. The carriage sections 47 and 48 are slidable longitudinally within body recess 46 and are vertically confined between the cover plates 25 and 26, all as illustrated in Fig. 4. Section 48 has an integral lug 50 received within a recess 51 in section 47, and also a shaft 52 extending through a bore 53 in section 47. Provision is made for clearances at 54 and 55 between the opposed faces of the sections to permit their relative movement from positions of engagement to disengagement, within the limits required for sequential application of the pipe rotating member 47 and the gripping elements 16 to the pipe.

Member 57 is shown to be rotatably driven by a power unit 58 suitably attached to the bottom portion of the carriage section 47 extending downwardly through slot 59 in the lower cover plate 26. The power unit 58 may be of any suitable type such as a fluid driven turbine or an electric motor, and is shown illustratively as a turbine to which compressed air or steam is supplied through line 61. A worm 62 on the motor shaft 63 drives a gear 64 contained within housing 65 attached at 66 to the turbine housing. Gear 64 is keyed to a shaft 67 journaled at 68 and 69 within carriage section 47 and carrying at its upper end the pipe rotating member 57. Shaft 67 extends upwardly through a slot 70 in carriage section 48 to permit the required relative longitudinal movement between the sections, as referred to above. The upper portion of the shaft extends through a longitudinal slot 71 in the top cover plate 25.

In the broad aspects of the invention, member 57 may consist of any suitable rotatable element capable of engaging and rotating an upper stand of pipe after the joint is initially broken or loosened (in a breaking tongs), or of rotating the upper pipe stand into final making engagement with the threads of the lower stand (in a make-up tongs). As illustrative, member 57 may comprise a disk or cylinder of sufficient axial surface length to give the necessary length of contact with the pipe for frictional purposes, and formed at its surface of a material having sufficient coefficient of friction against the pipe as to rotate the latter. For example, the pipe engaging surface of the disk 57 may be made of a suitable relatively hard metal such as steel or malleable iron, or a softer alloy having the necessary coefficient of friction with the pipe, or the surface may be that of a friction composition such as fabric impregnated with the usual wear resisting substances. Where fabric or other yielding material is employed, the material may contain abradants such as finely divided metal, or wire, to give increased friction between the disk surface and the pipe.

The carriage assembly 46 is actuated from a power source carried by the tongs body 11 and comprising preferably a cylinder 72 attached at 73 and 74 to the under surface of the body, compressed air or steam being selectively delivered to opposite ends of the cylinder from line 74a through pipes 75 and 76 under control of a fourway valve 77. Compressed air will be referred to typically as the piston operating fluid. Air exhausts from one end or the other end of the cylinder under control of the valve 77, through outlet 78. Cylinder 72 contains a piston 79 having a rod 80 extending through the cylinder head stuffing box 81 and attached at 82 to a lug 83 integral with and depending from a block 84 movable longitudinally within a bore 85 in the tongs body. Lug 83 projects downwardly through a slot 86 at the bottom of bore 85. Block 84 has a bore 87 receiving the end of shaft 52 and has a loose connection with the shaft through pin 88 projecting within the slot 89 in the block, and also by virtue of clearance at 90 between the end of the shaft and the end of bore 87. Movement is imparted to carriage section 47 from block 84 in applying disk 57 to the pipe, through a coil spring 91 placed about shaft 52 and confined between the block and carriage section.

Figure 2:
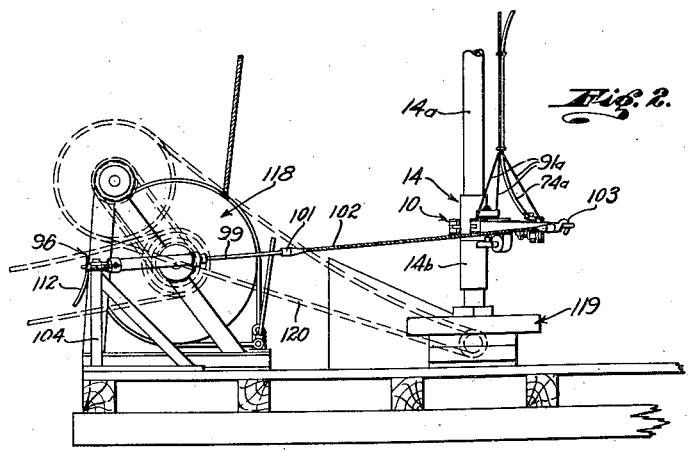
Fig. 2 is a front elevation of Fig. 1.

The tongs may be supported for application to and removal from the pipe by any suitable means. Merely as illustrative, the tongs are shown to be suspended by cables 91a, see Fig. 2, attached to the body 11 at points that will cause the tongs to be supported properly in horizontal position.

In describing the operation of the tongs, it will be understood that the tongs will be applied to an upper pipe stand 14a to be disconnected from or connected to the pipe string 14b being elevated from or lowered into the well, as the case may be, and that the string 14b is vertically supported and held against rotation in the usual manner. Also as will be understood, separate tongs are employed in making up and breaking the pipe joints. Fig. 1 shows a make-up tong adapted to be rotated clockwise to screw together the joint sections, whereas Fig. 3 shows a breaking tong adapted to be oppositely rotated to unscrew the pipe joint. A description of the operation of the breaking tong of Fig. 3 will suffice for an understanding of the invention.

The tongs first are applied to the drill pipe section 14a directly above the joint at 93, with the pipe in engagement with the stop member 39 and properly centered with respect to the dies 25. Valve 77 then is operated to admit compressed air to cylinder 72 through pipe 75 to advance the piston and block 84. Springs 43 are made to have greater yielding resistance than spring 91, with the result that as block 84 moves toward the right, carriage section 47 first is correspondingly moved to bring disk 57 into engagement with the pipe, and thereafter spring 91 is compressed to the point at which the end of shaft 52 will be brought into engagement with the end 90 of the block bore 87. Continued movement to the right of block 84 moves surface 49 of the carriage section 48 against the links 29, 30 and 31 to press dies 38 against the pipe. Continued movement of block 84 displaces stop member 39 outward against the resistance of springs 43 to the point of bringing the pipe into engagement with dies 125. By having sufficient air pressure in cylinder 72, the dies in both sets 15 and 16 of the gripping elements may be brought into such tight engagement with the pipe stand 14a that upon counterclockwise rotation of the tongs, the joint at 93 may be initially broken to the extent that the stand 14a may be unscrewed with relatively less or little rotative force applied thereto.

Upon initially breaking the joint as described, the air pressure in cylinder 72 may be partially relieved (as may be observed by pressure gauge 94) to the extent that member 39 under the influence of springs 43 will disengage the pipe from dies 125, and spring 91 will expand sufficiently to release dies 38 from gripping engagement with the pipe. Sufficient air pressure will be maintained however in cylinder 72 that the pressure communicated to carriage section 47 from block 84 through spring 91, will hold disk 57 in engagement with the pipe 14a. Turbine 58 having previously been started to constantly rotate disc 57 in a clockwise direction, the disc rotation is imparted to the pipe 14a to unscrew the joint 93. During the joint breaking operation, sufficient upward pull will be maintained on pipe stand 14a by the derrick hook in the usual manner, to relieve the weight of the pipe stand at the joint and eliminate any tendency for binding in the joint threads. Stop member 39 may be provided with horizontally extending teeth 39a below the abutting ends of the pipe sections at the joint, so that the engagement of the teeth with the lower section 14b of the pipe will prevent the tongs from following or raising with the stand 14a as it is being unscrewed. Above the joint, member 39 may have a smooth pipe engaging surface 39b to give proper support for the upper stand 14a.

The make-up tong has the same construction as that shown and described, except that portion 12 of the body has reversed curvature with relation to the pipe in the operation of the make-up tong. The air pressure in cylinder 72 at first is controlled so as to bring the rotating disk 57 into engagement with the pipe, but with dies 38 disengaged therefrom and the pipe held by stop member 39 from engagement with dies 125. In the make-up tong, disk 57 is rotated in a counterclockwise direction to screw pipe stand 14a into the string 14b to the point at which further power is required to fully and tightly make-up the joint. It may be mentioned that rotation of the disc has an added effect in causing the tongs to automatically swing to the extent required to cause the elements 15 to engage and grip the pipe. The air pressure in cylinder 72 then is increased to the point at which both sets of dies 125 and 38 are brought into tight gripping engagement with the pipe, and the tongs are then bodily rotated to finally complete the joint.

Figs. 1, 2, 8 and 9 show my improved mechanism, herein termed the "reach," for swinging the tongs to rotate the pipe in making up the joints. In the drawings, a single reach is shown in solid lines in conjunction with the make-up tong. As will be understood, a duplicate reach mechanism may be provided for operation of the breaking tongs and positioned at the opposite side of the derrick floor, as indicated by the dotted lines at 95. The reach mechanism generally indicated at 96, comprises a cylinder 97, see Fig. 8, containing a piston 98, the rod 99 of which extends through stuffing box 100 to a connection 101 with a cable 102 which in turn is attached at 103 to the outer end of the tongs. The cylinder assembly is supported for horizontal and vertical swinging movements on a suitable support, such as pipe standard 104, by a suitable mounting 105 at the top of the standard. The mounting is shown typically to comprise a head 106 rotatable within pipe 104 and held against upward displacement by a bolt or rod 107. Lug 108 on the cylinder and casting 109 is pivotally connected by pin 110 with lugs 111 on the head 106, so that the cylinder is capable of vertical as well as horizontal swinging movement. Compressed air or steam from supply line 112 is selectively delivered under control of a four-way valve 113 to opposite ends of the cylinder 97 through pipes 114 and 115 having flexible sections 116 to accommodate vertical swinging of the cylinder. The cylinder exhaust occurs through the valve 113 to line 117.

Fig. 1 shows the reach cylinder assembly 96 to be positioned at one side of the conventionally illustrated draw works 118 from which the usual rotary table 119 is driven through chain 120. After the tongs have been applied to the pipe and the joint made up to the point at which the dies are brought into gripping engagement with the pipe for final take-up, compressed air is admitted to the reach cylinder 97 through pipe 115 to advance the piston 98 toward the left and swing the tongs 10 clockwise in a pipe tightening direction. In this manner, the pipe joint may be quickly and simply made-up as tightly as desired, although ordinarily it is preferable to place a predetermined limit upon the pull to be applied to the tongs. Such a limit may be placed by providing in line 115 a relief valve 121 set to maintain pre-determined maximum air pressure in cylinder 97, and thereby prevent the application of any excessive or destructive pull to the tongs by the reach. The advantages of this type of reach are readily apparent in that its construction and operation are of utmost simplicity, and all hazards ordinarily existing because of the use of various lines and cables subject to breaking an entanglement with the operators, are entirely avoided.

I claim:

1. Pipe tongs comprising a body having a pipe receiving opening, a pipe gripping element, a member carried by and movable relative to the body to press said element into gripping engagement with the pipe, a support movable relative to said member, a rotating member movable with said support and adapted to engage and rotate the pipe, and means carried by the body for moving the first mentioned member and said support.

2. Pipe tongs comprising a body having a pipe receiving opening, a pipe gripping element, a member carried by and movable relative to the body to press said element into gripping engagement with the pipe, a support movable relative to said member, a rotating member movable with said support and adapted to engage and rotate the pipe and means carried by the body for sequentially moving said rotatable member and gripping element into engagement with the pipe.

3. Pipe tongs comprising a body having a pipe receiving opening, a pipe gripping element, a member carried by and movable relative to the body to press said element into gripping engagement with the pipe, a support movable relative to said member, yielding means resisting relative movement of said member and support, a rotating member movable with said support and adapted to engage and rotate the pipe and means carried by the body for moving the first mentioned member and support.

4. Pipe tongs comprising a body including an elongated handle and a rigid portion of the body extending semi-circularly and forwardly from the handle to form a recess entered by the pipe through an opening at the side of the body, a plurality of pivotally connected pipe gripping elements within the handle side of said recess, means forming a pipe engaging surface within said recess and opposed to said gripping elements, power operated means carried by the body and movable against said elements to press the latter into gripping engagement with the pipe and confine the pipe between the gripping elements and said opposed surface, and means mounting said elements directly on the body for movement radially of said recess independently of said power operated means.

5. Pipe tongs comprising a body including an elongated handle and a rigid portion of the body extending semi-circularly and forwardly from the handle to form a recess entered by the pipe through an opening at the side of the body, a movable pipe gripping element within the handle side of said recess, means forming a pipe engaging surface within said recess and diametrically opposed to said gripping element, power operated means carried by the body and operatively connected with said element to move the latter into gripping engagement with the pipe and confine the pipe between the gripping element and said opposed surface, a rotatable member bodily movable by said power operated means and adapted to engage and rotate the pipe, and means carried by the body for rotating said member.

6. Pipe tongs comprising a body including an elongated handle and a rigid portion of the body extending semi-circularly and forwardly from the handle to form a recess entered by the pipe through an opening at the side of the body, a movable pipe gripping element within the handle side of said recess, means forming a pipe engaging surface within said recess and diametrically opposed to said gripping element, power operated means carried by the body, and operatively connected with said element to move the latter into gripping engagement with the pipe and confine the pipe between the gripping element and said opposed surface, a rotatable member mounted on said body and adapted to engage and rotate the pipe, and means for sequentially bringing said member and gripping element into operative engagement with the pipe.

7. Pipe tongs comprising a body having a pipe receiving opening, an element within said opening operable to grip and cause the pipe to rotate by rotation of said body therewith, a rotatable member mounted on the body and adapted to engage and rotate the pipe within said body and independently of the operation of said element, and a motor mounted on the body for rotating said member.

8. Pipe tongs comprising a body having a pipe receiving opening, an element movable radially within said opening and operable to grip and cause the pipe to rotate by rotation of said body therewith, a bodily movable rotatable member mounted on the body and adapted to engage and rotate the pipe within said body and independently of the operation of said element, and a motor carried by the body for rotating said member.

9. Pipe tongs comprising a body having a pipe receiving opening, an element within said opening operable to grip and cause the pipe to rotate by rotation of said body therewith, a rotatable member mounted on the body and adapted to engage and rotate the pipe within said body and independently of the operation of said element, means for yieldably pressing said member against the pipe, and a motor mounted on the body for rotating said member.

10. Pipe tongs comprising a body having a pipe receiving opening, an element movable radially within said opening and operable to grip and cause the pipe to rotate by rotation of said body therewith, a power unit carried by the body and operatively connected with said element to move the latter into gripping engagement with the pipe, a rotatably driven member mounted on the body and adapted to engage and rotate the pipe within said body and independently of the operation of said element, and a motor mounted on the body for rotating said member.

11. Pipe tongs comprising a body having a pipe receiving opening, an element movable radially within said opening and operable to grip and cause the pipe to rotate by rotation of said body therewith, a power unit carried by the body and operatively connected with said element to move the latter into gripping engagement with the pipe, a rotatably driven member mounted on the body and adapted to engage and rotate the pipe within said body and independently of the operation of said element, means for yieldably pressing said member against the pipe, and a motor mounted on the body for rotating said member.

12. Pipe tongs comprising a body having a pipe receiving opening, an element movable radially within said opening and operable to grip and cause the pipe to rotate by rotation of said body therewith, a power unit carried by the body and operatively connected with said element to move the latter into gripping engagement with the pipe, a rotatably driven member mounted on the body and adapted to engage and rotate the pipe within said body and independently of the operation of said element, and means whereby said power unit operates to sequentially engage said rotatably driven member and gripping element with the pipe.

13. Pipe tongs comprising a body having a pipe receiving opening, a pipe gripping element movable radially within said opening, a rotatably driven member mounted on the body for movement radially of said opening and adapted to engage and rotate the pipe, and means for sequentially moving said rotatable member and gripping element radially of the pipe receiving opening into engagement with the pipe.

14. Pipe tongs comprising a body having a pipe receiving opening, a pipe gripping element movable radially within said opening, a rotatably driven member mounted on the body for movement radially of said opening and adapted to engage and rotate the pipe, said member having a substantially cylindric pipe engaging surface, and means for sequentially moving said rotatable member and gripping element radially of the pipe receiving opening into engagement with the pipe.

DONOVAN B. GRABLE.